Feb. 6, 1923.
J. G. GRACEY.
TIRE PROTECTOR FOR AUTOMOBILE WHEELS.
FILED JAN. 30, 1920.
1,444,603.
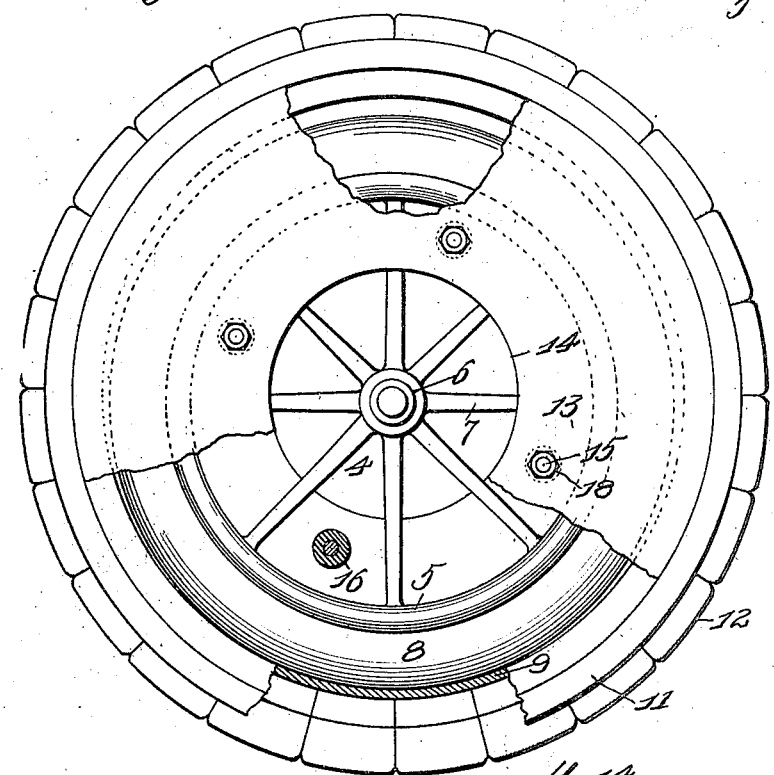
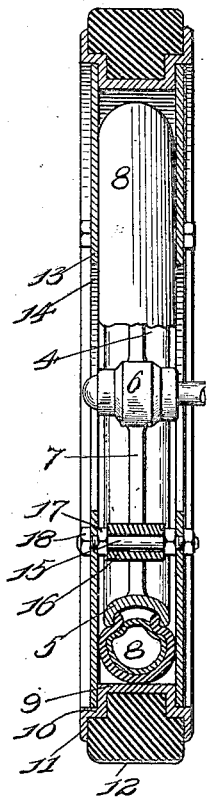
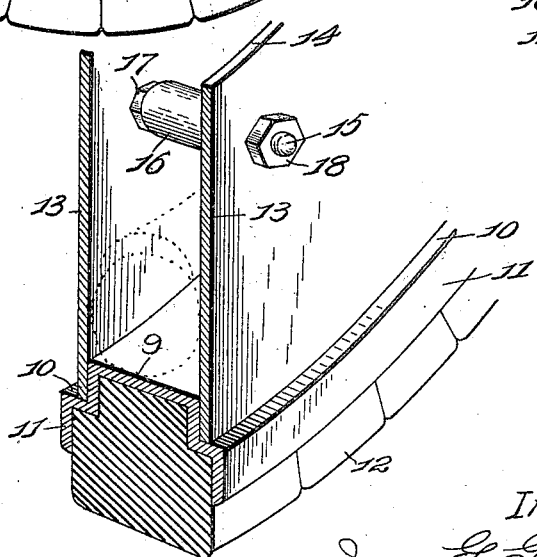
Inventor
James G. Gracey.

Patented Feb. 6, 1923.

1,444,603

UNITED STATES PATENT OFFICE.

JAMES G. GRACEY, OF ST. LOUIS, MISSOURI.

TIRE PROTECTOR FOR AUTOMOBILE WHEELS.

Application filed January 30, 1920. Serial No. 355,292.

*To all whom it may concern:*

Be it known that I, JAMES G. GRACEY, a citizen of the United States, and resident of St. Louis, Missouri, have invented certain new and useful Improvements in a Tire Protector for Automobile Wheels, of which the following is a specification.

This invention relates to improvements in a tire protector for automobile wheels, and has for its object a rim in which is supported a solid tire of resilient material, a pair of side discs in contact with the rim and means for holding the side discs together and for clamping the rim and discs around an ordinary pneumatic tire automobile wheel.

A further object of my invention is to construct a rim which is to be placed over an ordinary automobile wheel the said rim being of a diameter slightly larger than the automobile wheel so as to permit suitable play for the wheel in order to relieve pressure against the wheel as well as to remove all jolting and wear on the tire.

Figure 1, is a side elevation of my invention with parts broken away showing its application on the automobile wheel.

Fig. 2, is a vertical sectional view of the same.

Fig. 3, is a detail sectional perspective view of a portion of my improved appliance.

Referring to the drawing in detail 4 indicates an ordinary automobile wheel which comprises a rim 5, a hub 6, spokes 7 and a pneumatic tire 8. Over this ordinary wheel is placed my invention which consists of a rim 9, the same having offsets forming shoulders 10 and flanges 11. This rim by its construction forming a channel in which is supported a solid tire 12 which is preferably in the form of blocks of resilient material, these blocks being in sections so that in the event any one of these blocks should become worn the same may be removed and a new block inserted in the channel.

On the shoulders 10 is placed side plates or discs 13, the same having a central opening 14 which is of a size large enough to allow sufficient movement for the hub and axle and for the general play of the wheel inside of the rim.

These plates or discs are held in position by means of bolts 15 and in order to avoid marring of the spokes I place over the bolts a suitable sleeve of resilient material 16, the same being preferably of rubber or like material. This sleeve being held in position between a pair of lock nuts 17, said nuts acting as a suitable spacer for the plates and on the ends of the bolts are placed nuts 18 by which the bolts are firmly locked and hold the plates in clamped position against the rim.

These bolts are located at suitable intervals apart and so positioned as to allow suitable freedom for the spokes except when the spoke contacts therewith.

The purpose of this is to provide a means whereby the pneumatic tire is puncture proof so that an ordinary non-skid pneumatic tire may be used at the same time providing the same amount of resiliency to the vehicle as if the rim were not used.

The device is simple in construction and can be readily and easily applied on the wheel with little trouble and when the wheel is in operation and the rim strikes an obstruction the play between the rim and the surface of the inner tire is sufficient to roll the rim over the obstruction without in any way causing a jolt to the vehicle.

Having fully described my invention what I claim is:

A tire protector for auto wheels comprising a one-piece rim, of channel formation, a tire of solid resilient material supported in the channel, shoulders formed on the rim, a pair of plates contacting with said shoulders in combination with an ordinary auto wheel over which is placed the rim and plates, said plates held on each side of the wheel and held together by bolts, said rim being of a diameter slightly larger than the periphery of the wheel to which it is applied so as to permit the wheel to have play in the rim, substantially as specified.

In testimony whereof, I have signed my name to this specification, in presence of two subscribing witnesses.

JAMES G. GRACEY.

Witnesses:
 ALFRED A. EICKS,
 B. AUSTINE.